(12) United States Patent
Sivalingam et al.

(10) Patent No.: US 10,956,782 B2
(45) Date of Patent: Mar. 23, 2021

(54) TRAINING FOR CAMERA LENS DISTORTION

(71) Applicant: QUALCOMM Incorporated, San Diego, CA (US)

(72) Inventors: Ravishankar Sivalingam, San Jose, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/193,970

(22) Filed: Nov. 16, 2018

(65) Prior Publication Data

US 2020/0160106 A1 May 21, 2020

(51) Int. Cl.
*G06K 9/62* (2006.01)
*G06T 7/70* (2017.01)
*G06T 5/00* (2006.01)

(52) U.S. Cl.
CPC ............ *G06K 9/6256* (2013.01); *G06T 5/002* (2013.01); *G06T 7/70* (2017.01)

(58) Field of Classification Search
CPC .. G06K 9/00221–00389; G06K 9/6256; G06T 2207/30196–30201; G06T 5/002; G06T 7/70; H04N 5/23219; H04N 21/4223; H04N 21/44218; G06F 17/30793
See application file for complete search history.

(56) References Cited

U.S. PATENT DOCUMENTS

| | | | | |
|---|---|---|---|---|
| 8,982,180 | B2* | 3/2015 | Corcoran | G06T 3/0062 |
| | | | | 348/36 |
| 10,049,308 | B1* | 8/2018 | Dhua | G06K 9/4628 |
| 2011/0249153 | A1* | 10/2011 | Hirooka | G06T 5/006 |
| | | | | 348/241 |
| 2012/0224077 | A1* | 9/2012 | Imai | H04N 1/00336 |
| | | | | 348/222.1 |
| 2015/0055821 | A1* | 2/2015 | Fotland | G06T 7/246 |
| | | | | 382/103 |
| 2015/0070519 | A1* | 3/2015 | Motoki | H04N 5/23267 |
| | | | | 348/208.6 |
| 2016/0134810 | A1* | 5/2016 | Morofuji | H04N 5/23293 |
| | | | | 348/36 |
| 2018/0075322 | A1* | 3/2018 | Prasad | G06F 16/5866 |
| 2018/0131869 | A1* | 5/2018 | Kim | H04N 5/232133 |

(Continued)

OTHER PUBLICATIONS

On Classification of Distorted Images With Deep Convolutional Neural Networks (Year: 2017).*

(Continued)

*Primary Examiner* — Nizar N Sivji
(74) *Attorney, Agent, or Firm* — MG-IP Law, P.C.

(57) ABSTRACT

Cameras with large field-of-view lenses can cause significant geometric distortions of the images acquired. Training for object detection normally takes place on undistorted images. Thus, in order to detect objects of interest within the acquired images, an undistortion procedure is applied on the acquired images and an object detection is then performed on the undistorted images. Unfortunately, such undistortion procedure is too computationally expensive to be run on some edge devices. To remove the need to perform the undistortion procedure, it is proposed to train for object detection directly from distorted acquired images.

10 Claims, 9 Drawing Sheets

(56) References Cited

U.S. PATENT DOCUMENTS

| | | | | |
|---|---|---|---|---|
| 2018/0315222 A1* | 11/2018 | Jones | ............ | G06T 15/005 |
| 2019/0208124 A1* | 7/2019 | Newman | ............ | G10L 17/005 |
| 2019/0294881 A1* | 9/2019 | Polak | ............ | G06K 9/4628 |
| 2019/0318201 A1* | 10/2019 | Ahmed | ............ | G06K 9/00201 |
| 2019/0392212 A1 | 12/2019 | Sawhney et al. | | |
| 2020/0097569 A1* | 3/2020 | Sewak | ............ | G06F 16/5846 |
| 2020/0125823 A1* | 4/2020 | Lo | ............ | G06K 9/0063 |

OTHER PUBLICATIONS

The Automatic Undistortion Strength Estimation for Any Describable Optical Distortion (2019) (Year: 2019).*

Vision-Based People Detection System for Heavy Machine Applications (2015) (Year: 2015).*

Robust Homography for Real-Time Image Un-Distortion (2013) (Year: 2013).*

\* cited by examiner

TRAINING FOR CAMERA LENS DISTORTION

FIELD OF DISCLOSURE

One or more aspects of the present disclosure generally relate to computer vision processing, and in particular, to training for camera lens distortion.

BACKGROUND

Cameras with large field-of-view lenses can cause significant geometric distortions of the images acquired. Certain types of computer vision models may perform poorly during the inference/testing phase, unless an undistortion procedure is first applied on the images. Often, such undistortion procedure is too computationally expensive to be run on some edge devices.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method of training an object detection device is disclosed. The method may comprise obtaining one or more distorted training images. The method may also comprise training an object detection model based on the one or more distorted training images. The method may further comprise providing the trained object detection model to the object detection device. Each of the one or more distorted training images may include distortions that would be present in images directly captured by the object detection device. The trained object detection model may enable the object detection device to detect one or more objects of interest in distorted images captured by the object detection device.

An exemplary method of processing images is disclosed. The method may comprise obtaining one or more captured images by capturing one or more images through a lens of an object detection device. The one or more captured images may include distortions caused by the lens. The method may also comprise detecting one or more objects of interest directly from the captured images.

An exemplary training processor is disclosed. The training processor may comprise a processor and a storage. The processor and the storage may be configured to obtain one or more distorted training images. The processor and the storage may also be configured to train an object detection model based on the one or more distorted training images. The processor and the storage may further be configured to provide the trained object detection model to an object detection device. Each of the one or more distorted training images may include distortions that would be present in images directly captured by the object detection device. The trained object detection model may enable the object detection device to detect one or more objects of interest in distorted images captured by the object detection device.

An exemplary object detection device is disclosed. The object detection device may comprise a processor, a plurality of object classifiers, and a memory. The processor, the plurality of object classifiers, and the memory may be configured to obtain one or more captured images by capturing one or more images through a lens of the object detection device. The one or more captured images may include distortions caused by the lens. The processor, the plurality of object classifiers, and the memory may also be configured to detect one or more objects of interest directly from the one or more captured images.

Another exemplary training processor is disclosed. The training processor may comprise means for obtaining one or more distorted training images. The training processor may also comprise means for training an object detection model based on the one or more distorted training images. The training processor may further comprise means for providing the object detection model as training data to the object detection device. Each of the one or more distorted training images may include distortions that would be present in images directly captured by the object detection device. The trained object detection model may enable the object detection device to detect one or more objects of interest in distorted images captured by the object detection device.

Another exemplary object detection device is disclosed. The object detection device may comprise means for obtaining one or more captured images by capturing one or more images through a lens of an object detection device. The one or more captured images may include distortions caused by the lens. The object detection device may also comprise means for detecting one or more objects of interest directly from the captured images.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
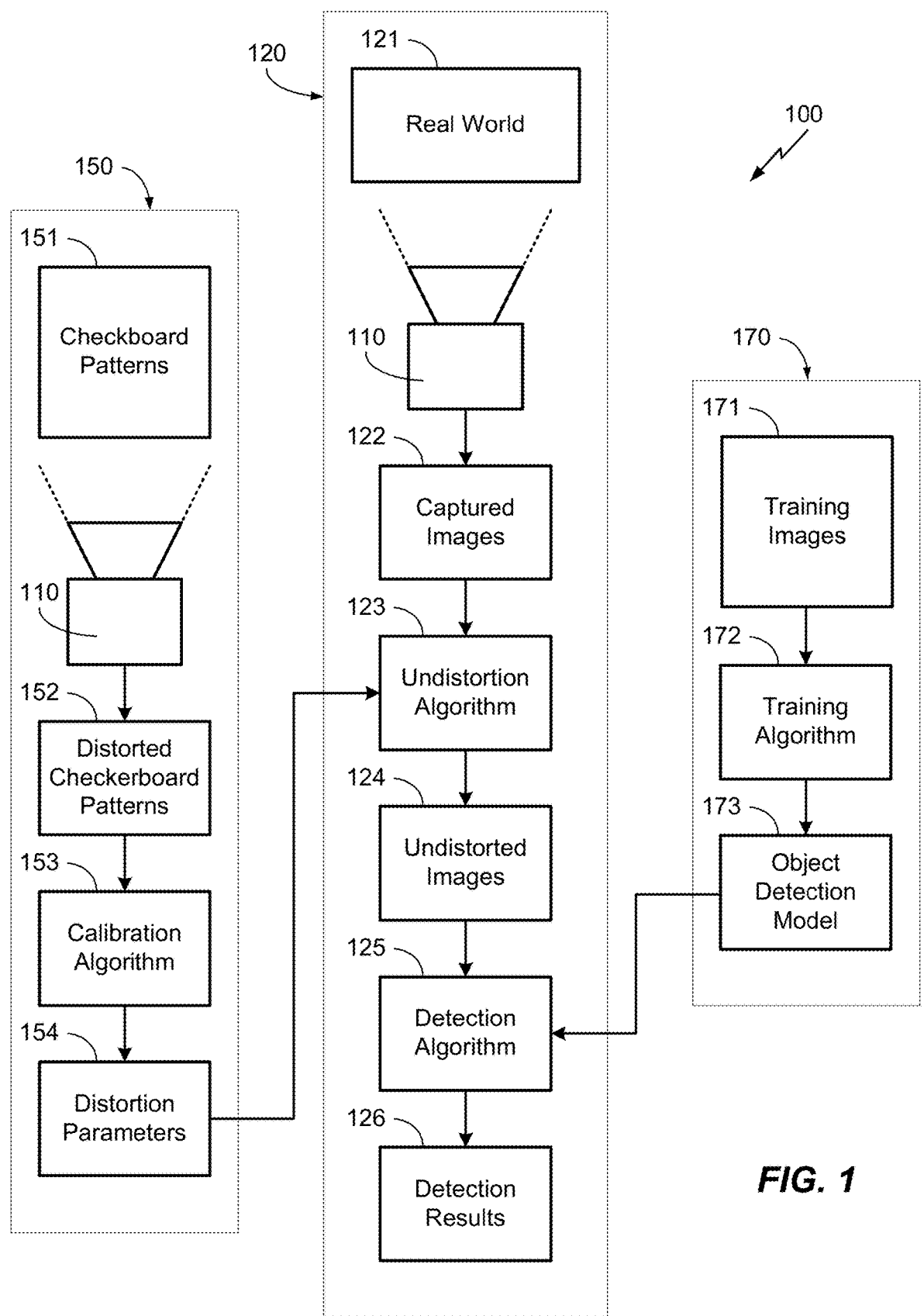
FIG. 1 illustrates a conventional approach used in training object detection models.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Recall from above that images acquired from cameras with large field-of-view lenses can suffer from significant geometric distortions. This can be especially true for less expensive lens. For example, a single element lens of a cheaper material may be used for cost reasons. In general, distortion is worse with fewer elements and cheaper materials. Also recall that some computer vision models may perform poorly unless the images are first undistorted. One disadvantage (of which there can be several) is that for some edge devices, applying undistortion procedures can be too expensive computationally, e.g., in terms of power, MIPS, or both.

An example of an edge device is an Always-On Computer Vision Sensor (AOCVS), which is an ultra-low power sensor including an image sensor, a wide (e.g., a 90° diagonal) field-of-view lens, along with a dedicated computer vision processor. One of the computer vision algorithms running on the AOCVS may be object detection, using cascades of boosted LBP (local binary pattern) classifiers.

Almost all of the input images used for training these object detection models are captured using other types of cameras, which in most instances do not accurately represent the geometric distortions present in images captured through the AOCVS wide field-of-view lens. Therefore, the object detection models perform poorly when an object of interest is located towards the edges of the image, where the geometric distortions are severe.

A typical approach to deal with such problems is to undistort the image before applying the object detection models, such as the conventional approach 100 illustrated FIG. 1. The conventional approach 100 involves three processes—an inference process 120, a calibration process 150, and a training process 170—to enable detection of objects from images taken by a target camera 110.

The inference process 120 is performed online by a device that includes the target camera 110 to perform object detection. In the inference process 120, real world images 121 are captured by the target camera 110. If the lens of the target camera 110 is wide, e.g., wider than 60°, the captured images 122 will be distorted geometrically. An undistortion algorithm 123 is applied to the captured images 122 to arrive at undistorted images 124. A detection algorithm 125 is applied to the undistorted images 124 to arrive at detection results 126 to detect whether one or more objects of interest are in the undistorted images 124.

The type of distortion (e.g., barrel distortion, pincushion distortion) and the amount of distortion depends on the particular characteristics of the target camera 110 such as the lens. This means that the undistortion algorithm 123 should also be particular to the target camera 110. The calibration process 150, which is an offline process, determines the distortion parameters 154 of the target camera 110, which are then used in the undistortion algorithm 123 to undistort the images acquired by the target camera 110.

In the calibration process 150, distorted checkerboard patterns 152 are captured by the target camera 110 from checker board patterns 151. The captured distorted checkerboard patterns 152 are provided to a calibration algorithm 153 to estimate distortion parameters 154 of the target camera 110. The estimated distortion parameters 154 are provided to the undistortion algorithm 123 to undistort the captured images 122 in the inference process 120.

The training process 170, which is an offline process, is performed to determine the detection algorithm 125. In the training process 170, training images 171 from multiple sources are applied to a training algorithm 172 to train an object detection model 173 to detect specific objects of interest. Since the inputs to the detection algorithm 125 are undistorted images 124, the training images 171 are also undistorted.

Regarding the conventional approach 100, the inference process 120 is performed to detect the objects of interest. Included in the inference process 120 is the undistortion algorithm 123, which is computationally expensive to perform. For edge devices such as the AOCVS, performing the undistortion algorithm 123 is not practical. This is because the AOCVS are intended to be always on. The always on capability is achieved by designing the AOCVS as ultra-low power consumption (e.g., milliwatts, sub-milliwatts consumption) devices. However, performing the computationally expensive undistortion algorithm 123 consumes relatively high power. This in turn can compromise the always on capability, especially when the AOCVS is battery-powered.

To address one or more issues associated with the conventional approach, it is proposed to incorporate the expected lens distortion into the images used to train the object detection models. To state it another way, it is proposed to use distorted images during training. In this way, the need for the target object detection device to perform the computationally expensive undistortion process can be removed.

Figure 2:
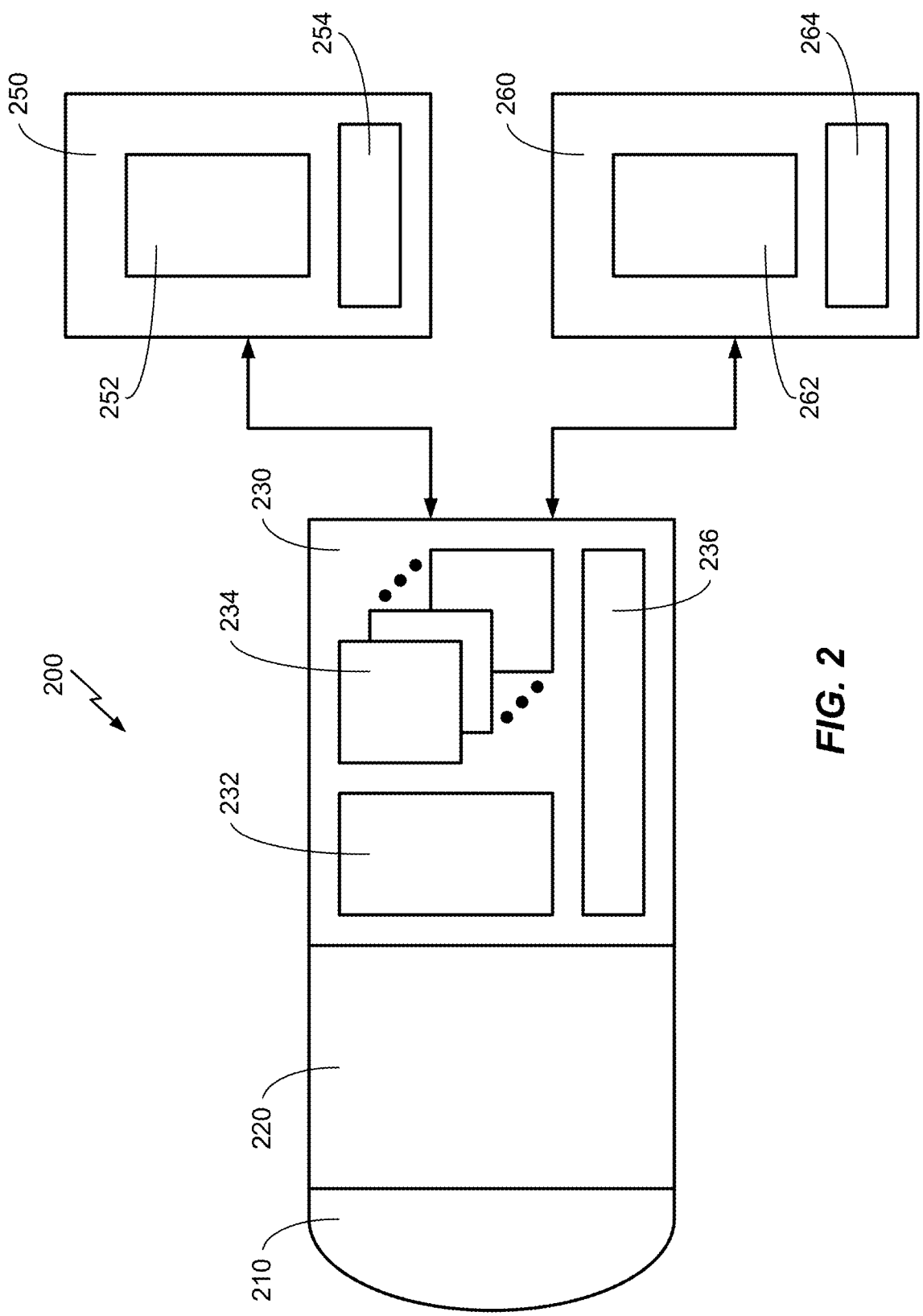
FIG. 2 illustrates an example of an object detection device.

FIG. 2 illustrates an example of an object detection device 200 that may be configured to detect one or more objects of interest (e.g., faces, human body, gestures, signs, toys, cars, patterns, logos, etc.) within its field-of-view without having to undistort images prior to performing the object detection. In other words, the object detection device 200 may detect the objects of interest directly from captured images which are distorted. The object detection device 200 may be an edge device such as an AOCVS. The object detection device 200 may be configured to communicate with a training processor 250 and with a data processor 260.

The object detection device 200 may include a lens 210, an image sensor 220, and an image processor 230. The lens 210 may be configured to capture one or more images, the image sensor 220 may be configured to sense the images captured by the lens 210, and the image processor 230 may be configured to process the sensed images.

The object detection device 200 may be such that the images captured through the lens 210—the captured images 322 (described below with reference to FIG. 3) are distorted. For example, the lens 210 may be a wide angle lens. For purposes of discussion, a wide angle lens may be described as a lens with a field-of-view (FOV) that is wider than a threshold angle, such that there are distortions in the images captured through the lens 210. A fish eye lens may be an example of a wide angle lens. An example threshold angle may be 60°. The FOV of the lens 210 may be much greater than the threshold angle, e.g., 90° or more. The distortion characteristics of the object detection device 200 may be parameterized through distortion parameters 354 (described below with reference to FIG. 3). FOV may be one example of a distortion parameter 354. The image sensor 220 (e.g., CMOS sensor) may be configured to sense the captured images 322. The image sensor 220 may comprise a plurality of pixels.

The image processor 230 may be configured to process the captured images 322 sensed by the image sensor 220 to detect one or more objects of interest within the captured images 322. The image processor 230 may include a processor 232, a plurality of object classifiers 234, and a memory 236. The processor 232 may comprise one or more low power processing devices and be configured to control the overall operations of the image processor 230.

The plurality of object classifiers 234 may be configured to classify and identify the objects of interest present within the captured images 322. A plurality of local binary pattern (LBP) classifiers may be an example of the plurality of object classifiers 234. The plurality of object classifiers 234 may be arranged to form a cascade of classifiers using LBP features and other features derived from LBP features including local ternary patterns (LTP). The memory 236 may be configured to store instructions and data to enable the processor 232 and the plurality of object classifiers 234 to implement a detection algorithm 325 (described below with reference to FIG. 3) to detect the objects of interest. The detection algorithm 325 may be trainable to detect different objects of interest (also described further below).

The image processor 230 may communicate with the training processor 250 and the data processor 260 to receive inputs (e.g., commands, queries, object detection models) and to provide outputs (e.g., command responses, query responses, object detection data). Functionally, the training processor 250 may be separate from the object detection device 200. The training processor 250 may be a server, a GPU, a multi-processor cluster, etc. That is, the training processor 250 and object detection device 200 need NOT be local to each other. The training processor 250 may provide trained object detection models to the object detection device 200 to enable the object detection device 200 to detect the objects of interest.

During operation, the image processor 230 of the object detection device 200 may communicate with the data processor 260, e.g., to provide object detection data. The data processor 260 may also be separate from the object detection device 200. The data processor 260 may be a server, a GPU, a multi-processor cluster, etc. That is, the data processor 260 and object detection device 200 need NOT be local to each other. The data processor 260 may receive data regarding objects of interest detected by the object detection device 200. The training processor 250 and the data processor 260 may be implemented in a same physical hardware, or may be implemented as separate entities.

The training processor 250 may comprise a processor 252 (comprising one or more processing devices) and a storage 254 (comprising any combination of volatile and non-volatile storage medium). The storage 254 may store instructions performed by the processor 252 including instructions to implement an example approach 300 illustrated in FIG. 3 used in training object detection models for object detection. Unlike the conventional approach 100, the approach 300 can be used to perform object detection directly on the distorted images. This removes the need to perform the computationally expensive algorithm to undistort the images for the object detection.

The data processor 260 may comprise a processor 262 (comprising one or more processing devices) and a storage 264 (comprising any combination of volatile and non-volatile storage medium). The storage 264 may store instructions performed by the processor 262 including instructions to receive object detection data from one or more object detection devices 200.

The approach 300 may involve three processes—an inference process 320, a calibration process 350, and a training process 370—to enable detection of objects of interest directly from the captured images 322. The inference process 320 may be performed online by a target device, such as the object detection device 200, to detect the objects of interest. In the inference process 320, real world images 321 may be captured by the object detection device 200. It may be assumed that the captured images 322 are distorted due to one or more distortion characteristics of the object detection device 200. For example, the lens 210 may be a wide angle lens. The lens 210 may be made from less expensive materials, incorporate fewer elements, or a combination of both. A detection algorithm 325 may be applied to process the captured images 322 directly to arrive at detection results 326, which may be sent to the data processor 260. Through performing the detection algorithm 325, the object detection device 200 may be able to detect whether there are any objects of interest in the captured images 322 even when the captured images 322 are distorted.

As seen, the approach 300, and in particular the detection algorithm 325, may perform object detection directly on the captured images 322 themselves. This is opposite of the conventional approach 100 in which the computationally expensive undistortion algorithm 123 is performed on the captured images 122, and then the object detection is performed on the resulting undistorted images 124.

The training process 370 may involve training on distorted training images 371 to train the plurality of object classifiers 234 of the object detection device 200 so that when the object detection device 200 performs the detection algorithm 325, objects of interest can be detected from the distorted captured images 322. The training process 370, which may be an offline process (e.g., performed by the training processor 250), may include applying the distorted training images 371 to a training algorithm 372. In so doing, the object detection model 373 may be trained, which when provided to the detection algorithm 325 enables the object detection device 200 to identify the objects of interest. The object detection model 373 may be customized or adjusted to enable the detection algorithm 325 to detect one or more specific objects of interest (e.g., faces, human body, gestures, signs, toys, cars, patterns, logos, etc.).

Figures 4A, 4B, 4C:
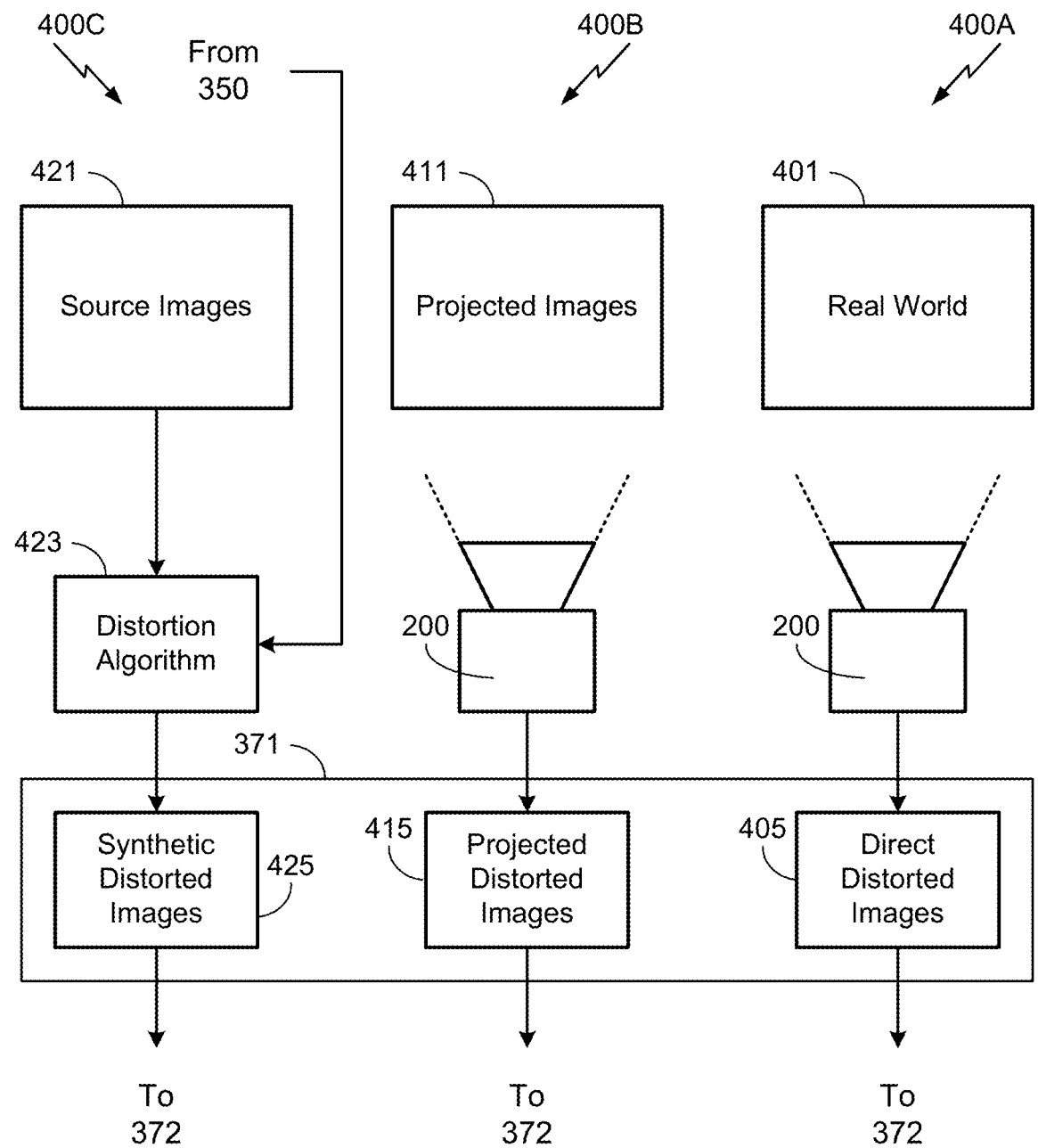
FIGS. 4A, 4B and 4C illustrate example processes to obtain distorted training images.

FIGS. 4A, 4B and 4C respectively illustrate example processes 400A, 400B and 400C to obtain the distorted training images 371. The distorted training images 371 may include any combination of direct distorted images 405, projected distorted images 415, and synthetic distorted images 425. It should be appreciated that for detection accuracy, the distorted training images 371 used in the training process 370 should reflect the nature of the distortions that result in images captured by the object detection device 200. This means that the distortions present in the distorted training images 371, i.e., in the direct distorted images 405, the projected distorted images 415, and the synthetic distorted images 425, should be particular to distortion characteristics of the object detection device 200. For example, if the FOV of the lens 210 is 90°, then the distorted training images 371 should appear like images captured through a lens with a 90° FOV. The distorted training images 371 should also reflect the physical characteristics of the lens 210 such as the type of material used in forming the lens 210, the number of lens elements, and so on.

As illustrated in FIG. 4A, one way to reflect the distortion characteristics is to capture real world images 401 using the object detection device 200 (or using at least the lens 210) to obtain the direct distorted images 405. This can be advantageous since this provides a very simple way to reflect the distortion characteristics of the object detection device 200.

Object detection accuracy can be enhanced by training on as many images as possible, i.e., the number of distorted training images 371 should be as high as possible. Increasing the number of direct distorted images 405 is a way of increasing the number of distorted training images 371. However, doing so would require heavy use of the object detection device 200 to directly capture the real world images 401. This could take substantial effort, time and costs.

As illustrated in FIG. 4B, another way to increase the number of distorted training images 371 is to take advantage of undistorted images already in existence. For example, the training images 171 used in the conventional approach 100 may be used. The undistorted images may be projected or displayed on a display (e.g., on a screen) as projected images 411. The projected images 411 may then be captured using the object detection device 200 (or using at least the lens 210) to obtain the projected distorted images 415. This can be advantageous in that existing images can be leveraged to obtain or increase the number of distorted training images 371.

In one aspect, the display may be oriented to directly face the lens 210. But in another aspect, the orientation of the display itself may be skewed, i.e., the display need not always directly face the lens 210. By skewing the display in any combination of vertical and horizontal angles, different views of an object may be generated from one view of the object. In another aspect, a skewed perspective of the undistorted image may be generated and displayed on the display. The lens 210, which faces the display directly head on, may capture the skewed display. Of course, a combination of both can be used—generating and displaying a skewed image, and capturing the skewed image at another skew angle. These are other ways to leverage the existing images.

Acquiring the direct distorted images 405 and the projected distorted images 415 both involve using the object detection device 200 (or the lens 210). However, if the distortion characteristics of the object detection device 200 can be parameterized, then as illustrated in FIG. 4C, existing images may be distorted on purpose to mimic or otherwise synthesize the distortion that would occur as if images are captured by the object detection device 200. In this aspect, existing source images 421 may be distorted in a distortion algorithm 423 to obtain the synthetic distorted images 425. This can be advantageous in that existing images can be leveraged to obtain or increase the number of distorted training images 371 without requiring the use of the object detection device 200 (or the lens 210). Another advantage is that the synthetic distorted images 425 may be obtained even if the source images 421 are distorted themselves, i.e., the source images 421 need not be limited to undistorted images only. The synthetic distorted images 425 may also include some level of image skewing.

Figure 3:
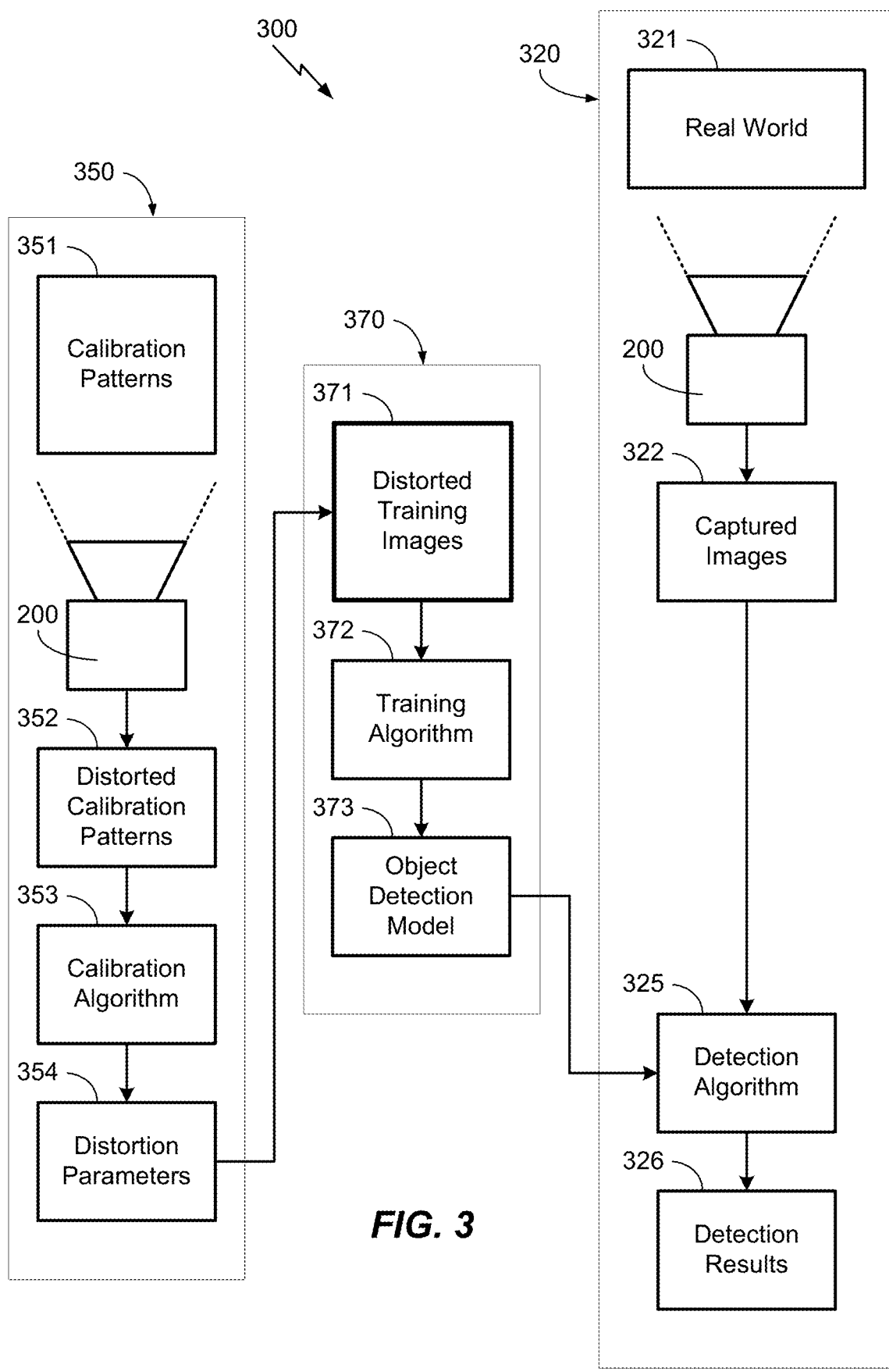
FIG. 3 illustrates an example approach used in training object detection models.

The distortion performed in the distortion algorithm 423 may be based on the distortion parameters 354 of the object detection device 200 determined through performing the calibration process 350. The training processor 250 may perform the calibration process 350 offline. With reference to FIG. 3, in the calibration process 350, images of calibration patterns 351 may be captured by the object detection device 200 (or at least the lens 210). For example, a checkerboard pattern may be used as the calibration pattern 351. The captured patterns—the distorted calibration patterns 352—may be provided to a calibration algorithm 353 to determine or estimate the distortion parameters 354 of the object detection device 200. Examples of the distortion parameters 354 may include any one or more of a focal length, a field-of-view (FOV), an image circle, type of distortion (e.g., barrel distortion, pincushion distortion, mustache distortion), amount of distortion, and so on. The distortion parameters 354 may also include the physical characteristics of the lens 210 described above. The distortion parameters 354 may further include orientation of the source images 421 similar to the orientation of the display discussed above in relation to the projected images 411.

Before proceeding further, it should be noted that it is NOT necessary that the same object detection devices 200 be used to obtain the direct distorted images 405 (see FIG. 4A), be used to obtain the projected distorted images 415 (see FIG. 4B), be used in the calibration process 350 (see FIG. 3), and be used in the inference process 320 (see FIG. 3). Different object detection devices 200 (or at least different lenses 210) may be used. It is sufficient that the object detection devices 200 or the lenses 210 have same or similar distortion parameters 354.

Referring back to FIG. 4C, the distortion algorithm 423 may receive the distortion parameters 354 from the calibration process 350, and the distortion algorithm 423 may generate the synthetic distorted images 425 based on the received distortion parameters 354. The distortion parameters 354 enable the distortion algorithm 423 to accurately reflect the distortion characteristics of the object detection device 200 in the synthetic distorted images 425.

The source images 421 distorted in the distortion algorithm 423 may be from multiple sources. For example, the undistorted images such as the training images 171 used in the conventional approach 100 may be used as source images. But in an aspect, some of the source images 421 may also be distorted. For example, one or more source images 421 may be captured with a camera having distortion characteristics different from those of the object detection device 200. If the type and amount of distortion of a source image 421 is known, then the distortion algorithm 423 may adjust the distortion performed on the distorted source image 421 such that the corresponding synthetic distorted image 425 mimics the distortions that would have been present had the undistorted version of the source image 421 been captured directly by the object detection device 200.

In an aspect, one or more source images 421 may be tagged with image parameters that indicate the type and/or amount of distortion already present in the tagged source images 421. The types of image parameters may be similar to the types of distortion parameters 354 (e.g., focal length, FOV, image circle, distortion type, distortion amount, etc.). In another example, the image parameters may be provided as separate inputs (e.g., user inputs) to the distortion algorithm 423. In a further example, the camera and/or lens type (e.g., model number) used to capture the source image 421 may be identified (e.g., as a tag or user input). The image parameters may be retrieved based on the identified camera and/or lens. Then for each source image 421 with tagged image parameters, the distortion algorithm 423 may adjust the distortion performed on that source image 421 based on the tagged image parameters and the distortion parameters 354.

For example, if the distortion parameters 354 indicates that the FOV of the lens 210 is 90°, then for each source image 421 captured through a lens whose FOV is not 90° (as indicated in the image parameters), the distortion performed on the source image 421 may be adjusted such that the corresponding synthetic distorted image 425 appears as if it has been captured through the lens 210.

Figure 5:
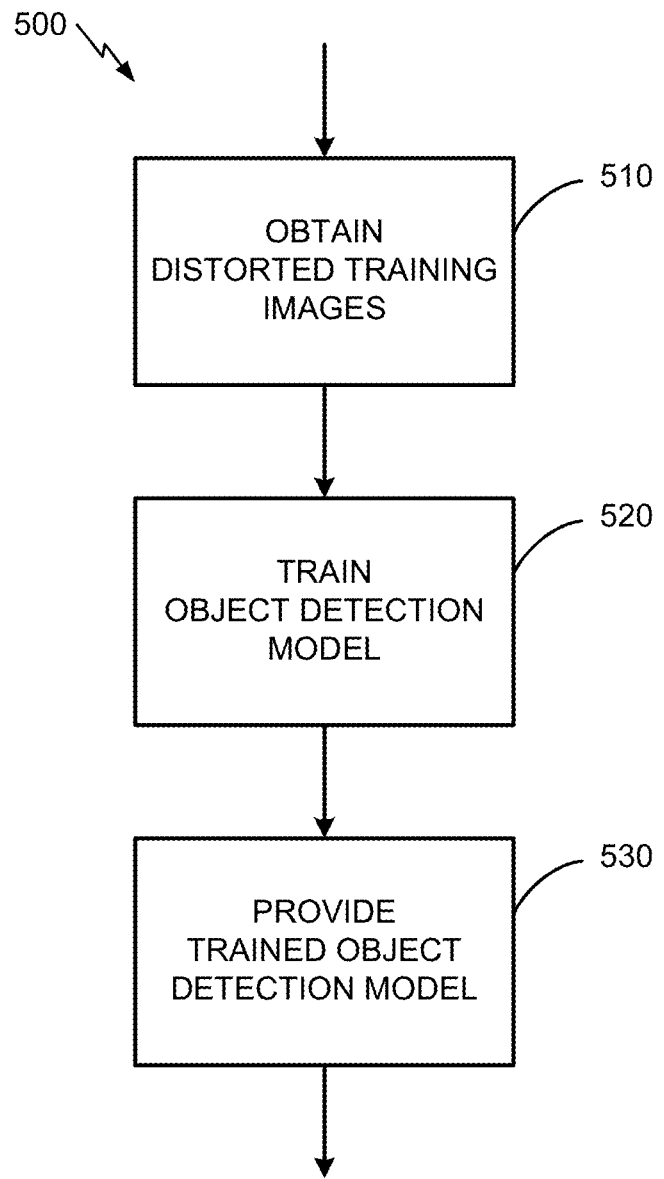
FIG. 5 illustrates a flow chart of an example method for training an object detection device.

FIG. 5 illustrates a flow chart of an example method 500 for training an object detection device 200 to detect one or more objects of interest. The method 500 may be performed offline, e.g., by the processor 252 and the storage 254 of the training processor 250. In an aspect, the method 500 may correspond to the training process 370. In block 510, the training processor 250 may obtain the distorted training images 371.

Figure 6A:
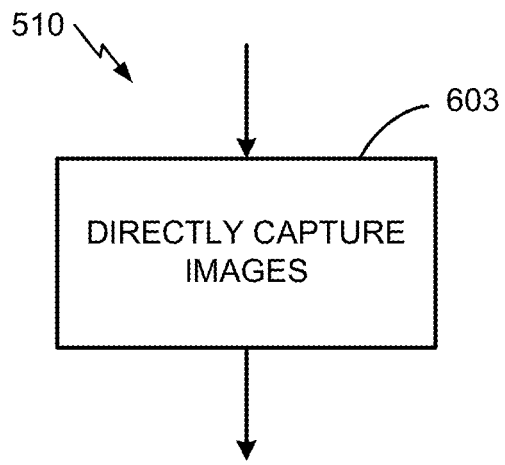
FIGS. 6A, 6B and 6C illustrate flow charts of example processes to obtain distorted training images.
Figure 6B:
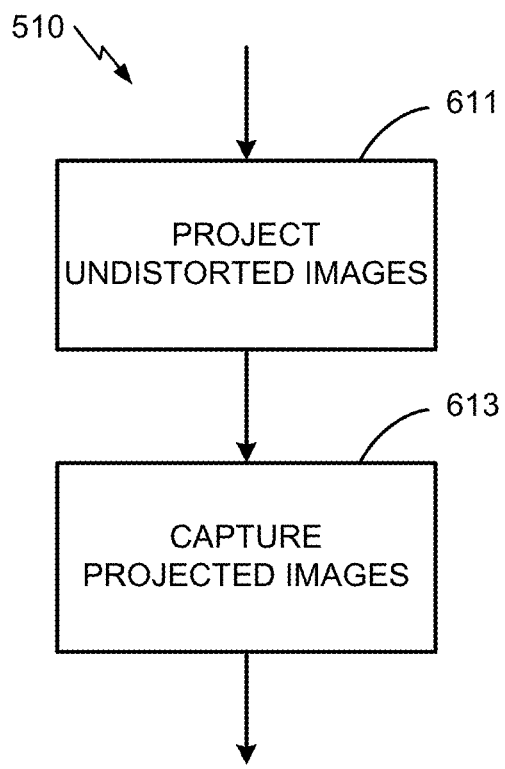
Figure 6C:
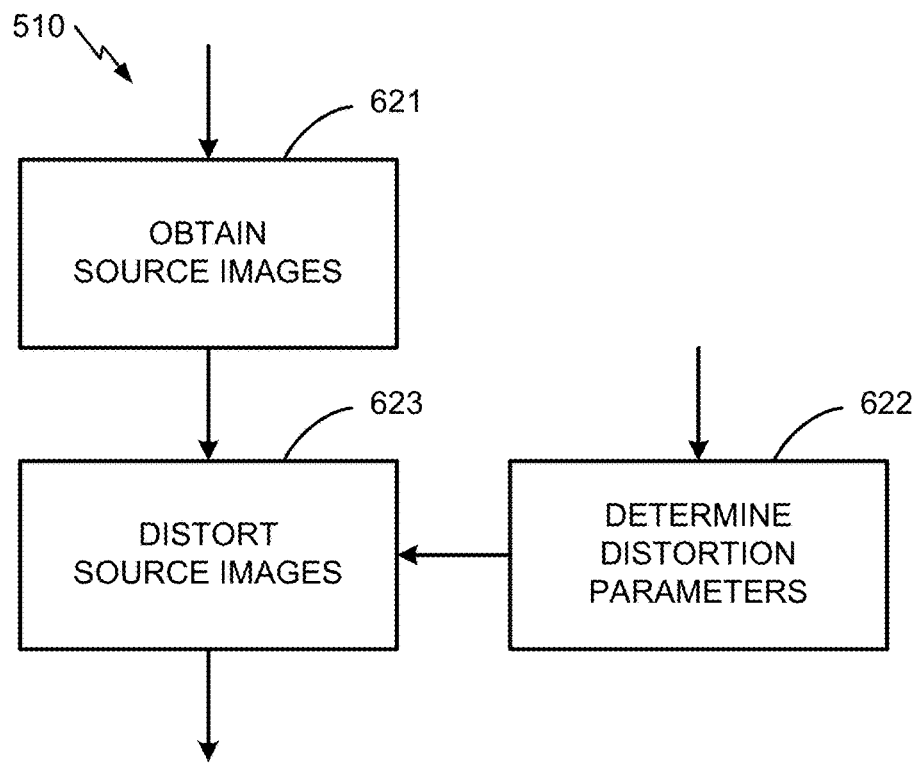

The distorted training images 371 may be obtained in a variety of ways. FIGS. 6A, 6B and 6C, which may correspond to the processes 400A, 400B and 400C, respectively, illustrate some (not necessarily exhaustive) processes that may be performed, e.g., by the training processor 250, to obtain the distorted training images 371. As indicated, the distorted training images 371 may be any combination of the direct distorted images 405, the projected distorted images 415, and the synthetic distorted images 425. As indicated, one commonality is that the distortions present in each of the direct distorted images 405, the projected distorted images 415, and the synthetic distorted images 425 include distortions as if the images are captured by the object detection device 200 (or at least the lens 210).

FIG. 6A illustrates an example process that may be performed to obtain the direct distorted images 405. In block 603, at least the lens 210 of the object detection device 200 may be used to capture the real world images 401 to obtain the direct distorted images 405.

FIG. 6B illustrates an example process that may be performed to obtain the projected distorted images 415. In block 611, undistorted images may be projected (e.g., on a screen) as projected images 411. In block 613, at least the lens 210 of the object detection device 200 may be used to capture the projected images 411 to obtain the projected distorted images 415.

FIG. 6C illustrates an example process that may be performed to obtain the synthetic distorted images 425. In block 621, the source images 421 may be obtained. In block 622, the distortion parameters 354 (e.g., focal length, a field-of-view (FOV), an image circle, type of distortion (e.g., barrel distortion, pincushion distortion, mustache distortion), amount of distortion, lens material type, number of lens elements, etc.) of the object detection device 200 may be determined.

Figure 7:
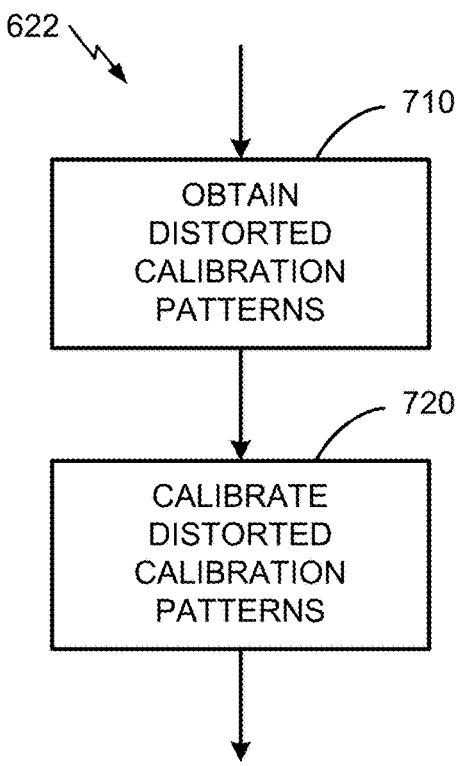
FIG. 7 illustrates an example process to determine distortion parameters of an object detection device.

FIG. 7 illustrates an example process to estimate or otherwise determine the distortion parameters 354. The process of FIG. 7 may correspond to the calibration process 350, and may be performed offline, e.g., by the training processor 250. In block 710, distorted calibration patterns 352 may be obtained. For example, images of standard calibration patterns 351 (e.g., checkerboard patterns) may be captured through at least the lens 210 of the object detection device 200. In block 720, the distorted calibration patterns 352 may be applied to the calibration algorithm 353 to determine the distortion parameters 354.

Referring back to FIG. 6C, in block 623, the source images 421 may be distorted to obtain the synthetic distorted images 425. For example, the distortion algorithm 423 may be applied to the source images 421. The distortion algorithm 423 may distort the source images 421 based on the distortion parameters 354 such that each synthetic distorted image 425 includes distortions that would be present had the synthetic distorted image 425 been captured by the object detection device 200 (or at least the lens 210) of an undistorted version of the source image 421.

The source images 421 obtained in block 621 need not be limited to undistorted images, i.e., each source images 421 can be distorted or undistorted. As described above, the distortion algorithm 423 may adjust the distortion performed on each source image 421 to account for the distortion that already exists in that particular source image 421. In this way, the synthetic distorted images 425 may reflect the distortion characteristics of the object detection device 200 even if the object detection device 200 was not involved in capturing the source images 421.

Referring back to FIG. 5, in block 520, the object detection model 373 may be trained on the distorted training images 371 (any combination of the direct distorted images 405, the projected distorted images 415, and the synthetic distorted images 425) to enable the object detection device 200 to identify objects of interest within the distorted captured images 322. In block 530, the trained object detection model 373 may be provided as training data to the object detection device 200.

Figure 8:
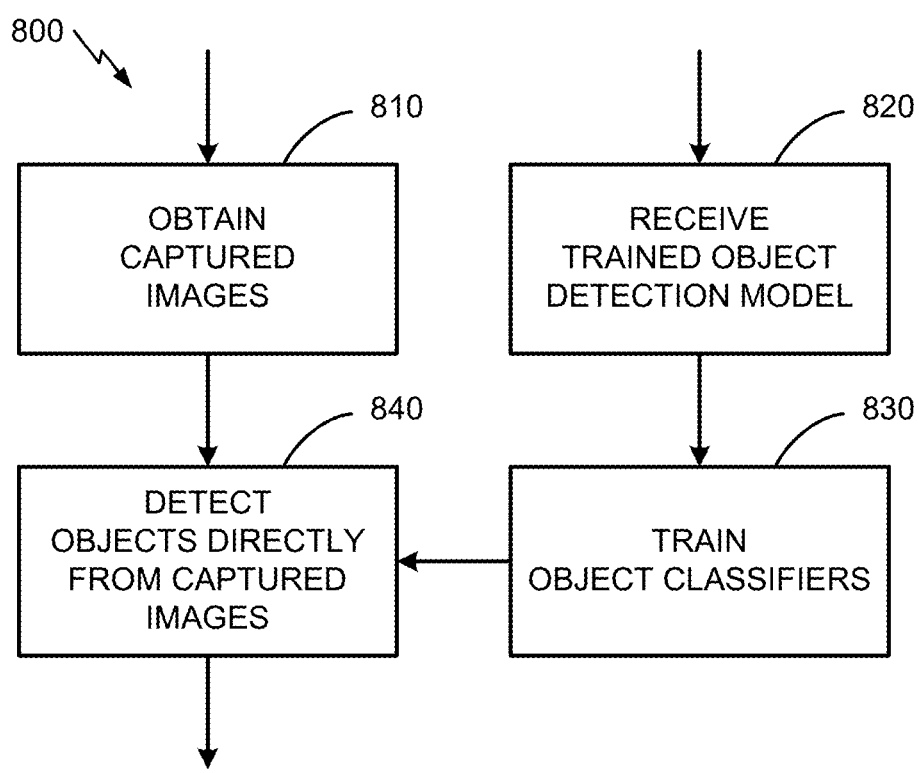
FIG. 8 illustrates a flow chart of an example method for detecting an object of interest within an image.

FIG. 8 illustrates a flow chart of an example method 800 for detecting one or more objects of interest within captured images 322. The method 800 may be performed online, e.g., by the object detection device 200. In an aspect, the method 800 may correspond to the inference process 320. In block 810, the object detection device 200 may capture one or more real world images 321 through the lens 210 as the captured images 322. It may be assumed that the captured images 322 have distortions due to the distortion characteristics of the object detection device 200 which, as described above, may be parameterized through the distortion parameters 354. For example, the FOV of the lens 210 may be so wide (e.g., wider than the threshold angle) such that distortions in the captured images 322 are difficult, if not impossible, to avoid.

In block 840, the object detection device 200 may detect the objects of interest directly from the captured images 322. Since the captured images 322 are directly processed, the computationally expensive undistortion process need NOT be performed to convert the captured images 322 into undistorted images. The objects may be detected by performing the detection algorithm 325, which may comprise processing the captured images 322 through the plurality of object classifiers 234. A plurality of local binary pattern (LBP) classifiers) may be an example of the plurality of object classifiers 234.

In block 820, the object detection device 200 may receive the training data of the trained object detection model 373, e.g., from the training processor 250. In block 830 the object classifiers 234 may be trained with the trained object detection model 373 to modify the behaviors of the object classifiers 234. In this instance, the term "trained" may be interpreted broadly. At one end, the object classifiers 234 may be trained "de novo" in that the behaviors of the object classifiers 234 may be determined entirely by the provided trained object detection model 373. At the other end, the object classifiers 234 that have been previously trained, may be "augmented" with the provided trained object detection model 373 to enhance accuracy, or otherwise increase their performance.

In an aspect, the object classifiers 234 may be trained such that even objects whose view is severely distorted in the captured images 322 are detected. To state it another way, the object detection device 200 may detect an object of interest even when the object, at least in part, occupies a peripheral region of a captured image 322. For purposes of discussion, the peripheral region may be defined as a region between the pixels of the captured image 322 corresponding to the threshold angle (e.g., 60°) of the lens 210 and the pixels of the captured image 322 corresponding to edge of the FOV (e.g., 90° or wider) of the lens 210. Conversely, an interior region may be defined as a region of the captured image 322 corresponding to the interior of the threshold angle.

Explanation is as follows. Normally, it is expected that the distortions in the image varies in different regions of the captured image 322. Typically, the distortion increases as the angle of view increases. For example, it is expected that the distortion is small in the center of the image (where the angle of view is small), and the distortion becomes severe at the edge of the image (where the angle of view is large). In an aspect, the captured image 322 may be divided into multiple regions. For example, the captured image 322 may be divided into the peripheral and interior regions, and the two regions may be demarcated by threshold angle as indicated above.

Being able to detect objects in the peripheral region is advantageous. In security camera type applications, it is desirable to detect objects as soon as possible, i.e., as soon as the object enters the field-of-view of the lens 210. Objects typically enter edges and corners of a scene where the distortions are the greatest. By training the object classifiers 234 to detect objects even when the view of the objects are severely distorted, i.e., by configuring to detect objects when the objects (at least partially) occupy the peripheral region, early object detection can be enabled in block 830. In an aspect, the object classifiers 234 may be configured to detect an object when at least a part of the object occupies pixels of the captured image 322 corresponding to the edge of the lens 210.

Another advantage can be realized when the object detection device 200 is fixed or cannot be moved easily. Normally, if a camera is movable and an object enters the scene of the camera, the camera can be moved so as to center the object in the camera scene where the distortion is minimal or non-existent. However, when the object detection device 200 is fixed, its orientation cannot be moved when an object enters the scene of the object detection device 200. Also, there is no guarantee that the object will move to the scene center. By training the object classifiers 234 to detect objects when the objects (at least partially) occupy the peripheral region, i.e., training to detect distorted views of objects, object detection is made possible even if the object does not enter the center.

The object classifiers 234 may be trained to detect distorted views of objects through the training process 370. That is, the object detection model 373 may be trained to recognize an object even when the object occupies the peripheral region of a captured image 322. In particular, the object detection model 373 may be trained to recognize an object occupying a region of the captured image 322 that correspond to the edge of the lens 210 (e.g., corresponding to the FOV angle).

It should be noted that not all illustrated blocks of FIGS. 5, 6A-6C, 7 and 8 need be performed, i.e., some blocks may be optional. Also, the numerical references to the blocks in these figures should not be taken as requiring that the blocks should be performed in a certain order. Indeed, some blocks may be performed concurrently.

Figure 9:
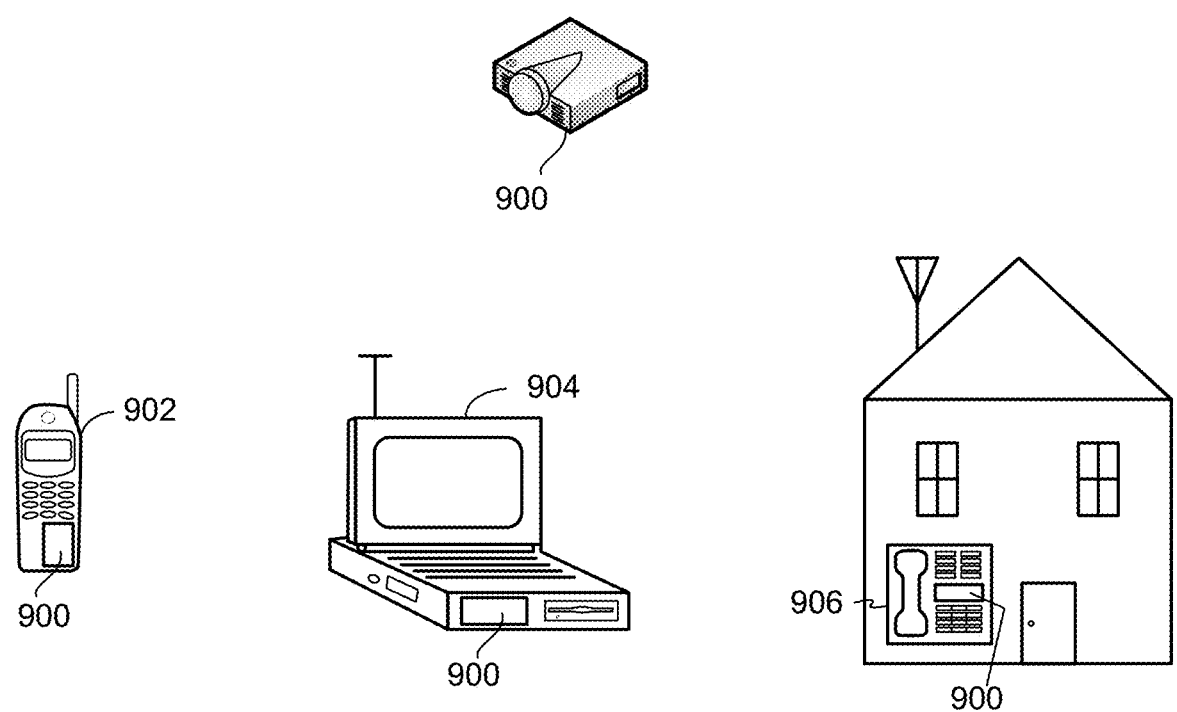
FIG. 9 illustrates non-limiting examples of devices with object detection devices integrated therein.

FIG. 9 illustrates various electronic devices that may be integrated with the aforementioned object detection device illustrated in FIG. 2. For example, a mobile phone device 902, a laptop computer device 904, a terminal device 906 as well as wearable devices, portable systems, that require small form factor, extreme low profile, may include an apparatus 900 that incorporates the object detection devices/systems as described herein. The apparatus 900 may also be a standalone device, such as a video sensor, a toy, a fixed sensor, an IoT (Internet of Things) device, etc. The devices 902, 904, 906 illustrated in FIG. 9 are merely exemplary. Other electronic devices may also feature the apparatus 900 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. A method of processing images, comprising:
   obtaining, by an object detection device, one or more captured images by capturing one or more images through a lens of the object detection device, the one or more captured images including distortions caused by the lens;
   receiving an object detection model from a training processor, the object detection model having been trained to recognize one or more objects of interest from distorted training images;
   training a plurality of object classifiers of the object detection device with the object detection model; and
   detecting, by the object detection device, the one or more objects of interest directly from the one or more captured images without undistorting the one or more captured images prior to performing the object detection,
   wherein the detecting includes classifying the one or more objects.

2. The method of claim 1, wherein detecting the one or more objects of interest comprises processing the one or more captured images through the plurality of object classifiers of the object detection device.

3. The method of claim 1, wherein the plurality of object classifiers comprise a plurality of local binary pattern (LBP) classifiers.

4. The method of claim 1, wherein detecting the one or more objects of interest comprises detecting at least one object of interest occupying a region of at least one captured image corresponding to an edge of the lens.

5. The method of claim 1,
   wherein detecting the one or more objects of interest comprises detecting at least one object of interest objects occupying a peripheral region of at least one captured image, and
   wherein the peripheral region is a region between pixels of the at least one captured image corresponding to a threshold angle of the lens and pixels of the at least one captured image corresponding to an edge of a field-of-view (FOV) of the lens, the FOV of the lens being wider than the threshold angle.

6. An object detection device comprising:
   a processor;
   a plurality of object classifiers; and
   a memory,
   wherein the processor, the plurality of object classifiers, and the memory are configured to:
      obtain one or more captured images by capturing one or more images through a lens of the object detection device, the one or more captured images including distortions caused by the lens,
      receive an object detection model from a training processor, the object detection model having been trained to recognize one or more objects of interest from distorted training images,
      train the plurality of object classifiers with the object detection model; and
      detect the one or more objects of interest directly from the one or more captured images without undistorting the one or more captured images prior to performing the object detection, and
   wherein the detecting includes classifying the one or more objects.

7. The object detection device of claim 6, wherein the plurality of object classifiers are configured to process the one or more captured images to detect the one or more objects of interest.

8. The object detection device of claim 6, wherein the plurality of object classifiers comprise a plurality of local binary pattern (LBP) classifiers.

9. The object detection device of claim 6, wherein the processor, the plurality of object classifiers, and the memory are configured to detect at least one object of interest occupying a region of at least one captured image corresponding to an edge of the lens.

10. The object detection device of claim 6,
    wherein the processor, the plurality of object classifiers, and the memory are configured to detect at least one object of interest occupying a peripheral region of at least one captured image, and
    wherein the peripheral region is a region between pixels of the at least one captured image corresponding to a threshold angle of the lens and pixels of the at least one captured image corresponding to an edge of a field-of-view (FOV) of the lens, the FOV of the lens being wider than the threshold angle.

* * * * *